(12) United States Patent
Keret et al.

(10) Patent No.: US 12,033,640 B2
(45) Date of Patent: Jul. 9, 2024

(54) REAL-TIME FRAUD DETECTION IN VOICE BIOMETRIC SYSTEMS USING REPETITIVE PHRASES IN FRAUDSTER VOICE PRINTS

(71) Applicant: NICE LTD., Ra'anana (IL)

(72) Inventors: Matan Keret, Oulu (FI); Jon A. Arrowood, Atlanta, GA (US); Peter Cardillo, Atlanta, GA (US)

(73) Assignee: NICE LTD., Ra'anana (IL)

( * ) Notice: Subject to any disclaimer, the term of this patent is extended or adjusted under 35 U.S.C. 154(b) by 443 days.

(21) Appl. No.: 17/474,606

(22) Filed: Sep. 14, 2021

(65) Prior Publication Data
US 2023/0082094 A1    Mar. 16, 2023

(51) Int. Cl.
| | |
|---|---|
| *H04L 9/00* | (2022.01) |
| *G06F 21/32* | (2013.01) |
| *G06N 20/00* | (2019.01) |
| *G10L 17/04* | (2013.01) |
| *G10L 17/12* | (2013.01) |
| *G10L 25/78* | (2013.01) |

(52) U.S. Cl.
CPC .............. *G10L 17/12* (2013.01); *G06F 21/32* (2013.01); *G06N 20/00* (2019.01); *G10L 17/04* (2013.01); *G10L 25/78* (2013.01)

(58) Field of Classification Search
CPC ................................ G06F 21/32; G06N 20/00
USPC ............................................................ 726/2
See application file for complete search history.

(56) References Cited

U.S. PATENT DOCUMENTS

| | | | |
|---|---|---|---|
| 9,437,186 B1* | 9/2016 | Liu .......................... G10L 15/05 |
| 2015/0055763 A1* | 2/2015 | Guerra ................ H04M 3/4936 |
| | | | 379/88.02 |
| 2022/0328050 A1* | 10/2022 | Hennig ................... G10L 17/24 |
| 2022/0366916 A1* | 11/2022 | dos Santos ............. G10L 17/04 |

* cited by examiner

*Primary Examiner* — Christopher J Brown
(74) *Attorney, Agent, or Firm* — Haynes and Boone, LLP

(57) ABSTRACT

A system is provided for real-time fraud detection with a fraudster voice print watchlist of repetitive fraudster phrases. The system includes a processor and a computer readable medium operably coupled thereto, to perform fraud prevention operations which include detecting a voice communication session having an audio signal of a user, accessing the fraudster voice print watchlist comprising a plurality of fraudster voice prints of the repetitive fraudster phrases, generating a voice print of the user using the audio signal, monitoring the user for real-time fraud detection using the fraudster voice print watchlist and the voice print of the user, and determining, based on the monitoring, whether the voice print of the user meets or exceeds a scoring threshold for matching with one or more of the plurality of fraudster voice prints from the fraudster voice print watchlist during the voice communication session.

20 Claims, 7 Drawing Sheets

REAL-TIME FRAUD DETECTION IN VOICE BIOMETRIC SYSTEMS USING REPETITIVE PHRASES IN FRAUDSTER VOICE PRINTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to biometric analysis and voice print comparison during fraud detection, and more specifically to a system and method for real-time fraud detection that uses repetitive phrases detected in two or more fraudster voice prints.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

When customers interact with different computing systems of a service provider, such as sales or purchasing systems, customer relationship management (CRM) systems, service or help systems, information systems, and the like, the customers may engage in voice communications, require voice authentication, and request sensitive information. These customers may correspond to individual users and/or users of an organization that may want to gain access to certain services and/or data, for example, computing service the users have enrolled in and/or purchased, data the user has stored or generated, and/or previous activity the user has performed with the service provider's systems. The service provider may want to monitor users' audio and corresponding voice prints, in real-time or near real-time, to detect fraudsters and prevent abuse and other malicious conduct. Biometric authentication and fraud analysis may provide more trusted authentication and fraud detection by performing authentication that should be particular to a specific user and difficult to imitate. Voice biometric systems may also provide fraud detection by monitoring users' voice communications and voice prints to determine if the users match past detected fraudster voice prints that committed computing attacks or abuse. During voice communications, such as communications over a publicly switched telephone network (PSTN), cellular network, voice over IP (VoIP), voice over LTE (VoLTE), and/or voice communications over data networks, voice biometric authentication and fraud detection may be done using voice samples from audio and voice prints generated from those voice samples. When fraudsters are detected with voice biometric systems, a recording of audio from a user, such as a phrase, name, identifier, voice sample during speech, or the like, may be stored in a database system of the service provider. The audio may be converted to a voice print and used during voice authentication and fraud detection by matching incoming voice prints during voice communication sessions to the previously detected and stored voice prints of fraudsters.

Often fraudsters may call a service provider, call center, and/or voice chat service to try to obtain customer information for customers of the service provider. Agents are usually customer-oriented and therefore may provide this sensitive information when attempting to provide aid and customer care. This information then allows fraudsters to perform account takeovers, steal identities, transfer money/items, and perform additional malicious acts. In order to reduce and/or eliminate malicious actions by fraudsters during voice communication sessions, voice biometric authentication and fraud detection systems may be used. Conventionally, the voice biometric systems suffer from issues in real-time fraud detection during voice communications. Service providers may utilize offline processes to detect fraudulent activity during calls; however, this does not assist live agents in real-time fraud detection during ongoing calls. Text-independent fraud detection that uses text-independent voice prints of fraudsters may be used, which may utilize watchlists having multiple fraudster voice prints. However, these watchlists have performance issues during scalability and may suffer from accuracy when performing text-independent voice biometrics. Thus, the text-independent voice biometric systems for real-time fraud detection may be limited in their accuracy and effectiveness, as well as have additional performance issues caused by large voice print watchlists and/or high system processing loads.

It therefore is desirable to retain the benefits of fraud detection using voice biometric analysis by building a mechanism for real-time fraud detection using text-dependent voice biometrics, while minimizing fraud, processing times, and latency issues that may prevent real-time fraud detection.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION OF PREFERRED EMBODIMENTS

Figure 1:
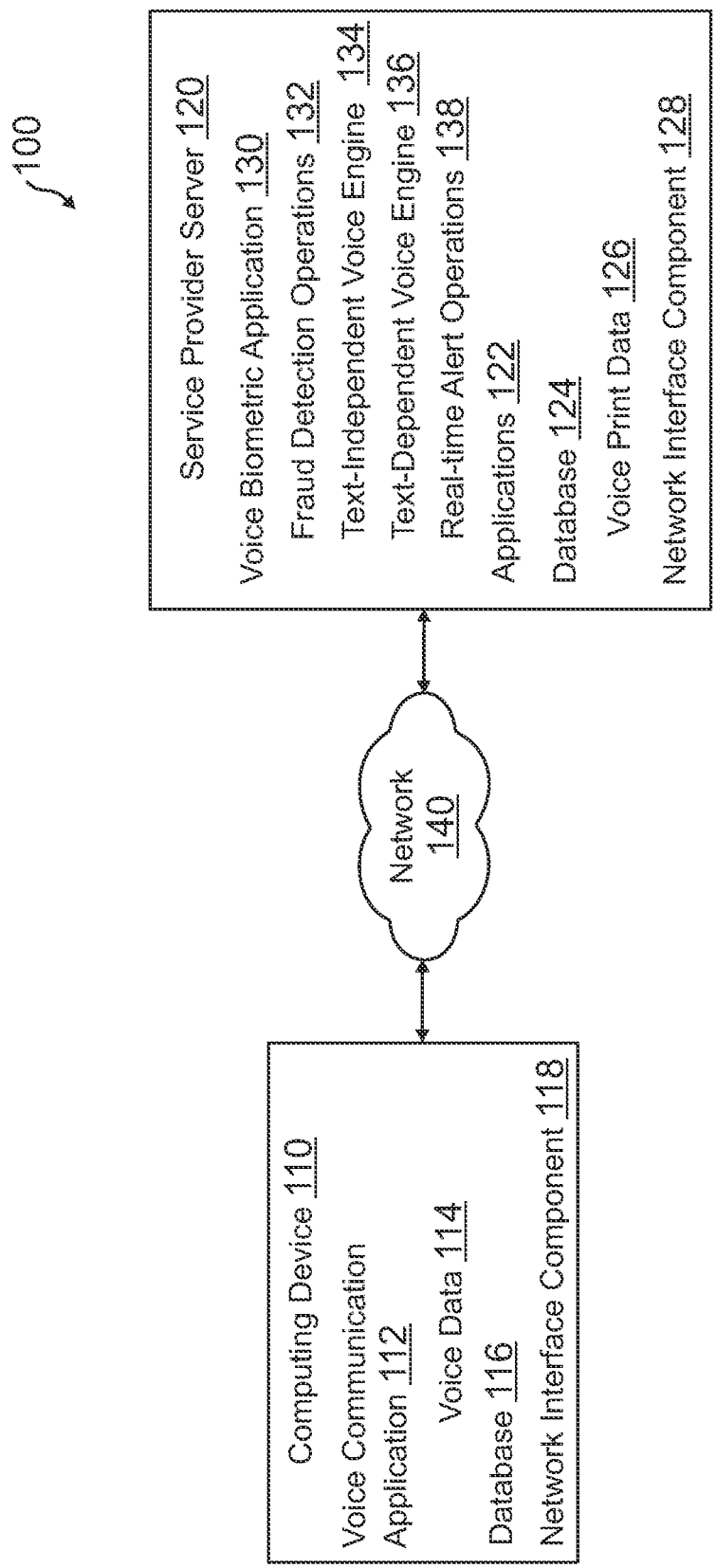
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent to one of ordinary skill in the art, however, that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a fraud detection system, such as a system for real-time fraud prevention (RTFP) for biometric analysis and/or authentication using voice prints, methods, data structures, and systems are provided herein to utilize text-dependent voice prints and voice biometrics. A service provider, such as a sale and purchasing system, help or assistance system, CRM system, customer service system, business management system, organizational management system, or other networked service provider, may provide audio and/or audiovisual communications. This may include phone calls, video conferencing, audio/video streaming, communication services, and the like. For example, different internal and/or external users of a service provider may interact over end-to-end voice communications, such as when engaging with and calling a customer service and/or CRM system. During voice communications, a voice biometric system may provide biometric authentication and fraud prevention through analysis of voice prints. This may include comparison of one or more stored voice prints of one or more fraudsters to a voice print determined and/or generated during the voice communications.

However, in conventional systems, voice biometric systems using fraudster voice prints may perform text-independent voice print comparison and matching. Text-independent voice print comparison may suffer from accuracy and effectiveness issues as the analysis depends on similarity of vectors and does not consider the words and phrases used in the underlying voice communications and audio signals. Additionally, text-independent voice biometric systems may not include a process to confirm, at a high rate of accuracy, that a fraudster is present during an ongoing suspicious call. Further, with many voice prints in a fraudster watchlist, many different comparisons may be required by the voice biometric system. This may not be optimized (or optimizable) in high load systems, and real-time performance for such fraud detection tends to become degraded and slowed. For example, on larger call sets, text-independent voice biometric systems that provide RTFP may result in a substantial number of false positives and a high percentage recall rate. However, using a voice biometric system that provides text-dependent voice print comparison and matching for RTFP, the number of false positives may be significantly reduced and such a system has been discovered to operate more efficiently.

In order to provide text-dependent voice biometrics for real-time fraud detection and prevention, a service provider may implement a voice biometric system that takes incoming calls or other voice communications and identifies calls as "high risk" or otherwise potentially fraudulent. This may be done using a high risk filter, such as based on pre-defined criteria, business data, authentication failures, designation by one or more agents, and the like, and combinations of each of the foregoing. Text-independent voice biometric matching may then be used to cluster calls and/or audio signals into clusters that have the same or similar voice (e.g., based on sound, tone, volume, language, speech, etc.).

Thereafter, a phrase match engine may be used to search for two or more putative fraudster audio data files (e.g., data files for audio signals from the calls or other voice communications) for the same or similar fraudster that repeats a phrase and/or states a phrase that matches to a degree of similarity. These phrases may correspond to repeated acoustic sequences that indicate that the same or similar words were repeated by one or more fraudsters having the same or similar voice. These matched phrases may be scored using text-dependent voice biometrics. Further dynamic time warping may be utilized to account for small differences between the same or similar person repeating the same or similar phrase during different calls.

Once repetitive portions of audio signals within the data files for the calls or other voice communications are identified, the audio signals are converted to voice prints. When an incoming audio or audiovisual call is received, the audio signal from the call may be processed (e.g., by processing the digital signals of the audio) so that a voice print may be determined. The voice print may correspond to a vector or other mathematical representation that allows for comparison to other vectors or mathematical representations from known fraudsters' voice prints (e.g., generated from audio of fraudsters). Generally, voice prints from audio data files may be used for fraudster voice print watchlists in both text-independent and/or text-dependent voice print comparison for RTFP in voice biometric systems. However, the audio from the putative fraudster data files having repetitive fraudster phrases may be saved and used in a text-dependent fraudster voice print watchlist, as described herein, to increase the accuracy and efficiency of such systems.

Thereafter, a voice biometric system performing RTPF using text-dependent voice prints may utilize this watchlist during incoming calls and other voice communications. The voice biometric system may compare a voice print from an incoming call (e.g., converted from incoming audio signals) to both text-independent and text-dependent fraudster voice print watchlists. Comparison of voice prints may be done through the voice biometric system of the service provider that performs audio conversion to voice prints and voice print comparison through vector analysis. When comparing vectors, a similarity score and/or similarity threshold score may be used to determine if a voice print from incoming audio sufficiently compares with and/or matches one or more fraudster voice prints. For example, a highest similarity score may be used and/or a 90% similarity score threshold (or other pre-selected score threshold based on percent similarity) may be required when matching voice prints to fraudster voice prints. Thus, in some embodiments, a highest scored comparison between voice prints (and their corresponding vectors) may be used to identify potential fraudster; however, a threshold may further be required to avoid false positives when a highest scored match may only be 25% and thus unlikely to be similar. It should be understood that, as processing technology, equipment, and other changes increase accuracy and efficiency, the thresholds for matching may be adjusted when desired.

To generate the voice print from the incoming call audio, the audio signals may be sent to a buffer every X seconds. The buffered audio signal may be converted to a voice print and the voice print extracted for comparison. Thereafter, the voice biometric system may utilize a text-dependent voice biometric engine to perform matching of the incoming voice print(s) and the text-dependent fraudster voice prints in the text-dependent fraudster voice print watchlist. A sliding window of the incoming voice print and the text-dependent fraudster voice prints may also be used to facilitate voice print comparison at different times during the incoming call. If a match is found, an alert may be triggered and may be sent to an agent or a supervisor/manager (e.g., via a web or application event, application programming interface (API) call, or using an already initiated API). However, if no matches are found, the incoming call may be further monitored based on additional buffered audio and generated voice prints.

The embodiments described herein provide methods, computer program products, and computer database systems for text-dependent fraudster voice biometric systems in real-time fraud detection. The service provider system associated with or incorporating a text-dependent fraudster voice biometric system may therefore process, encode, and compare voice prints during voice communications in a text-dependent manner, thereby providing more accurate voice biometrics and more robust RTFP during voice communications. For example, the online system may provide a biometric authentication and fraud detection system that provides voice fraud detection in real-time and/or with reduced latency, thereby resulting in faster and more accurate fraud detection and notification.

According to some embodiments, in a service provider computing system accessible by a plurality of separate and distinct organizations, a text-dependent fraudster voice biometric system is provided for identifying and designating particular voice prints as fraudsters based on repetitive fraudster phrases in audio data files. The generated voice prints that may be used for text-dependent voice biometrics in RTFP, thereby optimizing voice biometrics in fraud detection, reducing data processing resources and costs, and providing faster voice biometric processing with better accuracy.

Example Environment

The system and methods of the present disclosure can include, incorporate, or operate in conjunction with or in the environment of a voice biometric service, system, database, and portal, which may include web and device applications used for voice biometric processing for text-dependent fraudster authentication and/or fraud detection and prevention services during voice communications. FIG. 1 is a block diagram of a networked environment suitable for implementing the processes described herein according to an embodiment. As shown, an environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include computing device 110 and a service provider server 120 that interact to provide automated comparison of voice prints during voice communications for text-dependent voice biometric authentication and fraud detection. In other embodiments, environment 100 may not have all of the components listed and/or may have other elements instead of, or in addition to, those listed above. In some embodiments, the environment 100 is an environment in which a text-dependent voice biometric system is provided for RTFP using text-dependent voice prints. A computing device 110 may be any machine or system that is used by a user to perform voice communications and/or provide audio analyzed during real-time fraud detection using text-dependent voice biometrics. Computing device 110 can be a handheld computing device, a mobile phone, a laptop computer, a notepad computer, a workstation, and/or a network of computing devices. As illustrated in FIG. 1, computing device 110 might interact via a network 140 with service provider server 120, which performs the text-dependent voice biometrics.

Computing device 110 may be utilized to access computing services, resources, and/or data via voice communication application 112. Computing device 110 may be utilized by a customer, client, or another user that interacts with service provider server 120 for voice communications. A user's unique ID may be provided during a login or authentication process performed via computing device 110 with service provider server 120, which may require audio signals converted to a voice print for voice authentication that may be analyzed for fraud using fraudster voice prints. The user may further provide additional audio signals during a voice communication with service provider server 120 and/or an agent's device for an agent associated with service provider server 120, which may be used to further convert to and generate voice prints of the user that are compared to the fraudster voice prints in a fraudster voice print watchlist.

Computing device 110 may access computing resources provided by service provider server 120 and therefore fraud detection may be required to prevent or minimize malicious users and entities from fraudulently using such resources, as well as accessing sensitive or secure data. The user may provide audio signals via voice communication application 112 in the form of voice data 114 that is convertible to voice prints. Thus, computing device 110 may correspond to a device, server, or the like that interfaces with service provider server 120 to utilize the services, applications, data storage, and the like of the corresponding computing environment. Service provider server 120 may receive the unique ID for the customer and provide access to computing resources via applications 122, which may include applications provided by a CRM system using voice communications. In some embodiments, voice communication application 112 or other software applications residing locally on computing device 110 may access, display, output, and/or utilize applications 122 provided by service provider server 120.

Service provider server 120 may be utilized by different customers, clients, organizations, companies, and/or other users to access and utilize computing resources, which may provide voice biometrics for authentication and fraud detection, as discussed herein. Service provider server 120 may provide computing services via applications 122 and may utilize a voice biometric application 130 to provide voice authentication and fraud detection through voice biometrics. Applications 122 may include applications utilized by users, which provide services, data processing, storage, and the like to user via computing device 110, such as those involved in sale and purchasing, help or assistance services, call centers for customer business and/or inquiries, CRM, business management, organizational management, and the like. Voice biometric application 130 may include fraud detection operations 132 to perform voice biometric authentication and operations for RTFP. In order to perform fraud detection operations 132, a text-independent voice engine 134 and a text-dependent voice engine 136 may be utilized. If fraud is detected during ongoing calls using analyzed voice prints from the calls and stored text-independent and text-dependent fraudster voice print watchlists, real-time alert operations 138 may be executed to provide real-time alerts to agents during the ongoing calls.

Service provider server 120 may provide services for voice authentication and fraud detection through voice biometric application 130, which may include both text-independent and text dependent voice biometrics for authentication and RTFP. For example, voice data 114 may be provided by computing device 110 during voice communications. Voice biometric application 130 may utilize fraud detection operations 132 during voice communications to compare an incoming voice print from voice data 114 to one or more fraudster voice prints in fraudster voice print watchlists. Text-independent voice engine 134 may utilize a text-independent fraudster voice print watchlist for RTFP during voice communications. Text-dependent voice engine 136 may utilize a text-dependent fraudster voice print watchlist for RTFP during voice communications, which may be generated as discussed herein. Thus, text-dependent voice engine 136 may provide real-time alerts for real-time fraud detection during ongoing voice communications in a text-dependent manner.

Voice data 114 from voice communication application 112 on computing device 110 may be used when logging in to an account or other authentication system for access and use of computing services provided through applications 122. Voice data 114 may also be provided during voice communications, which may not require a prior authentication or may occur after the authentication. For example, voice data 114 may be provided during voice communications to access data, request transaction processing and other services, and otherwise engage in computing services via applications 122. Voice biometric application 130 may execute fraud detection operations 132 having text-independent voice engine 134 and text-dependent voice engine 136 to detect potential fraud when comparing incoming voice prints in real-time to fraudster voice prints. Voice biometric application 130 therefore allows service provider server 120 to perform voice biometric authentication and/or fraud detection of the user using computing device 110. The text-independent and text-dependent fraudster voice print watchlists used by text-independent voice engine 134 and text-dependent voice engine 136, respectively, may correspond to stored, vectorized, encoded, and/or compressed voice prints for voice biometric analysis and comparison. Thereafter, voice biometric application 130 may provide an authentication and/or fraud detection result to computing device 110 and/or an agent device monitoring and/or engaging in voice communications. Results and alerts may be provided by real-time alert operations 138, which may include alerts to approve or decline authentication, indicate potential fraud or a potentially fraudulent user in voice communications, and/or otherwise engage in an action to minimize or avoid fraud, account takeover, and other malicious actions.

In some embodiments, the users of computing device 110 may differ in their respective capacities, and the capacity of a particular computing device 110 might be determined by applications, permissions, and profiles for the current user. Thus, different users will have different capabilities and perform different authentication events with regard to accessing and authenticating via voice communication application 112. This is not mandatory, however, and it is understood that computing device 110 may generally have certain capacities that are universal to users, entities, or other clients (thereby not specific to operations submitted for processing by service provider server 120). Access and permission to use certain capacities may be modified at various times, and current user profiles may be updated, e.g., upon promotion into a new role that permits or requires different types of access.

Computing device 110 may execute a web-based client that accesses a web-based application for service provider server 120, or may utilize a rich client, such as a dedicated resident application, to access service provider server 120. Computing device 110 may utilize one or more application programming interfaces (APIs) to access and interface with service provider server 120 to engage in voice communications. Thus, voice communication application 112 can be used to access data and applications hosted by service provider server 120 and to perform searches on stored data, for example, through providing an audio and/or audiovisual interface to a user (e.g., a GUI output) or via an API of voice communication application 112. Interfacing with service provider server 120 may be provided through voice communication application 112 and may include data stored to a database 116, such as a device fingerprint, device ID, or other ID that may be provided during voice communications. Service provider server 120 may process and provide data through applications 122. Database 124 of service provider server 120 may store voice print data 126 associated with fraudster voice prints and/or fraudster voice print watchlists, such as encoded and/or compressed voice prints for text-independent and/or text-dependent voice biometrics.

Computing device 110 might communicate with service provider server 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between computing device 110 and service provider server 120 may occur over network 140 using a network interface component 118 of computing device 110 and a network interface component 128 of service provider server 120. In an example where HTTP/HTTPS is used, computing device 110 might include an HTTP/HTTPS client commonly referred to as a "browser" for sending and receiving HTTP// HTTPS messages to and from an HTTP//HTTPS server, such as service provider server 120 via network interface component 118. Similarly, service provider server 120 may host an online platform accessible over network 140 that communicates information to and receives information from computing device 110 via network interface component 128. Such an HTTP/HTTPS server might be implemented as the sole network interface between computing device 110 and service provider server 120, but other techniques might be used as well or instead. In some implementations, the interface between computing device 110 and service provider server 120 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Computing device 110 may utilize network 140 to communicate with service provider server 120, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, service provider server 120 is configured to provide webpages, forms, applications, data, and media content to computing device 110 and/or to receive data from computing device 110. In some embodiments, service provider server 120 may be provided or implemented in a server environment and/or cloud environment, which may be accessible through one or more APIs with or without a corresponding graphical user interface (GUI) output. Service provider server 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline back-ups or other redundancies, etc., and might include a distributed database or storage network and associated processing intelligence.

Several elements in the system shown in FIG. 1 include embodiments that are explained briefly here. For example, computing device 110 could include a desktop personal computer, workstation, laptop, notepad computer, PDA, cell phone, or any wireless access protocol (WAP) enabled device or any other computing device capable of interfacing directly or indirectly to the Internet or other network connection. Computing device 110 may also be a server or other online processing entity that provides functionalities and processing to other client devices or programs, such as online processing entities that provide services to a plurality of disparate clients.

Computing device 110 typically runs an HTTP/HTTPS client, e.g., a browsing program, such as Microsoft Internet Explorer® or Edge® browser, Google Chrome® browser, Mozilla Firefox® browser, or a WAP-enabled browser in the case of a cell phone, notepad computer, PDA or other wireless device, or the like. According to one embodiment, computing device 110 and all of its components are configurable using applications, such as a browser, including computer code run using a central processing unit such as an Intel Pentium® processor or the like. However, computing device 110 may instead correspond to a server configured to communicate with one or more client programs or devices, similar to a server corresponding to service provider server 120 that provides one or more APIs for interaction with computing device 110.

Thus, computing device 110 and/or service provider server 120 and all of their components might be operator-configurable using application(s) including computer code to run using a central processing unit, which may include an Intel Pentium® processor or the like, and/or multiple processor units. A server for computing device 110 and/or service provider server 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/ in which can be used to program a computer to perform any of the processes of the embodiments described herein utilizing one or more computing devices or servers.

Computer code for operating and configuring computing device 110 and/or service provider server 120 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116 and/or database 124, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun MicroSystems, Inc.).

Text-Dependent Voice Biometric System

Figure 2:
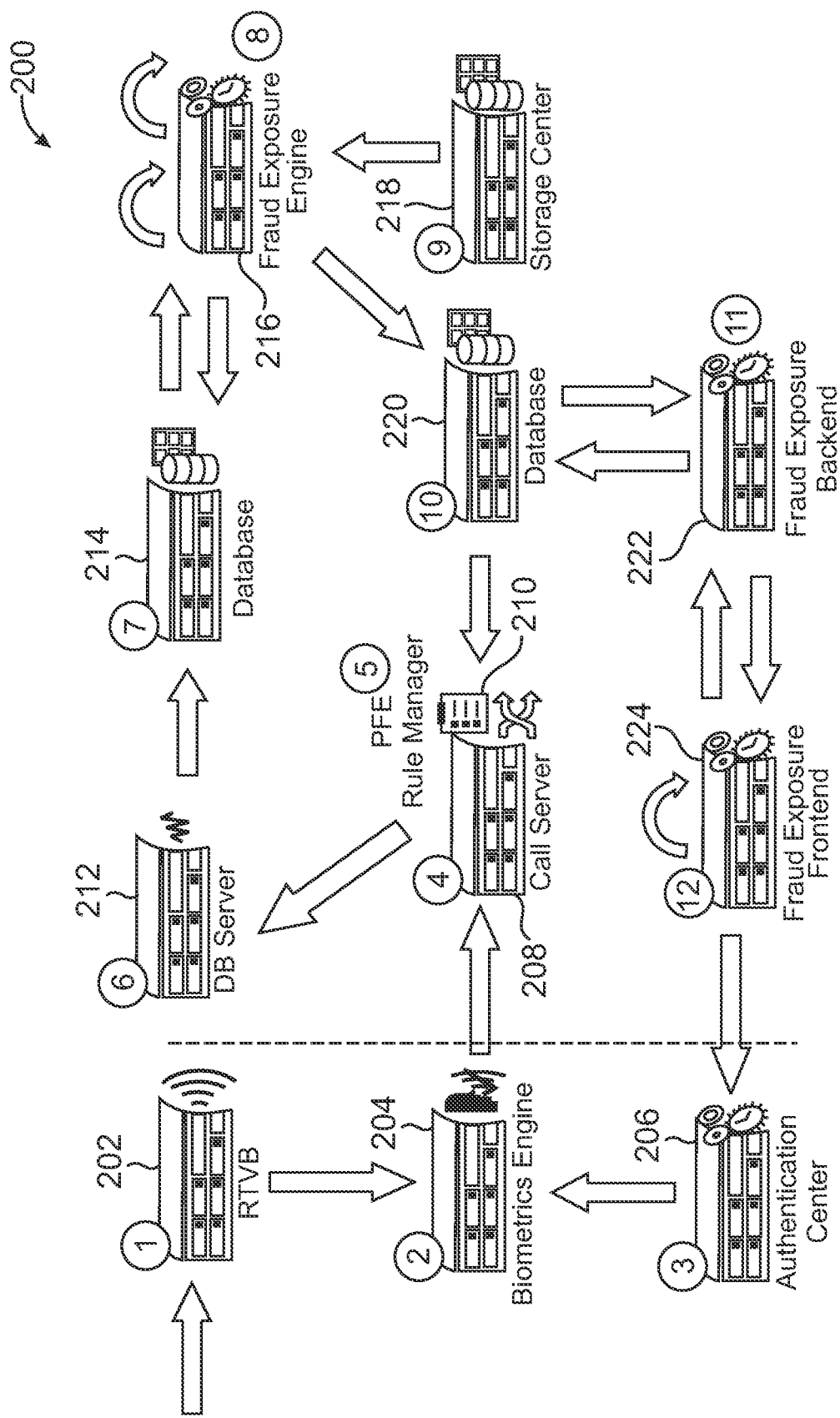
FIG. 2 is a simplified diagram of exemplary interactions with a service provider's systems that generate and implement text-dependent voice print watchlists for voice biometric fraud prevention according to some embodiments.

FIG. 2 is a simplified diagram of exemplary interactions with a service provider's systems that generate and implement text-dependent voice print watchlists for voice biometric fraud prevention according to some embodiments. Diagram 200 of FIG. 2 includes operations performed by the components of a service provider's systems and servers when receiving an incoming call or other voice communications, such as those voice communication exchanges, API calls, and data retrieval occurring by service provider server 120 discussed in reference to environment 100 of FIG. 1. In this regard, diagram 200 displays a RTFP flow between the components of the service provider's system when generating text-dependent fraudster voice prints and corresponding watchlists, and thereafter implementing in a real-time voice biometric system.

In diagram 200, initially a customer or other end user may contact an agent through a call center or other audio or audiovisual communication channel with the service provider (e.g., a CRM platform and communication channel). At or prior to an interaction 1, the incoming call may reach the call center and a new communication session and interactions may start with the service provider's system. The contact channel may communicate with an authentication system, such as a real-time authentication (RTA) system that performs voice biometric authentication. The system may further provide RTFP and may utilize text-independent and text-dependent voice biometrics and voice prints for RTFP. In this regard, at interaction 1, the incoming audio for the voice communications is buffered by a real-time voice buffer (RTVB) 202. Once buffered, RTVB 202 may then send the buffered audio, such as at every X seconds of buffered audio, to a biometrics engine 204, at an interaction 2. Biometrics engine 204 may correspond to an engine that performs authentication, fraud detection, and other voice biometric operations. This may include a proprietary voice biometrics engine of a service provider. The timing of X may be pre-selected by a user or agent, or may be set based on rules or other inputs such as current system load.

At an interaction 3, biometrics engine 204 may obtain fraudster voice print watchlist information from one or more resources, including a database 214 and/or a database 220. The fraudster voice print watchlists may be generated by and/or with an authentication center 206, which may allow one or more users to create, delete, and/or manage fraudster voice print watchlists. Once generated, those watchlists may be stored by databases 214 and/or 220 and may be provided to biometrics engine 204. The fraudster voice print watchlists may provide those fraudster voice prints to biometrics engine 204 in order to perform the authentication, fraud detection, and other voice biometric operations. The fraudster voice print watchlists may include both text-independent fraudster voice print watchlists and text-dependent fraudster voice print watchlists. Thus, authentication center 206 may allow users to interact with a service provider system for managing text-independent and text-dependent fraudster voice print watchlists for RTFP.

In order to create and/or update fraudster voice print watchlists, at an interaction 4, results of RTA and RTFP are provided from biometrics engine 204 to a call server 208. Call server 208 manages calls and other voice communications that are recorded in the system for RTVB 202, biometrics engine 204, and authentication center 206. In call server 208, a proactive fraudster exposure (PFE) rule manager 210 may tag relevant PFE calls according to one or more defined PFE rules, at an interaction 5. Call server 208 and PFE rule manager 210 may interact with database server 212, at an interaction 6, where database server 212 may manage interactions with the databases of the corresponding service provider and/or voice biometric system. These databases may include database 214 that, at an interaction 7, receives, stores, and holds for processing the pending PFE interactions and/or voice prints (e.g., potential fraudster voice prints).

At interactions 8 and 9, a fraud exposure engine 216 may receive PFE interactions and audio signals or audio data files (e.g., data files from calls and other voice communications) from database 214 and a storage center 218, respectively. Storage center 218 may hold archived calls as media data files, which may include those calls associated with PFE interactions. Fraud exposure engine 216 may process those files and generate voice prints. Fraud exposure engine 216 may perform voice print creation and then voice print clustering using one or more clustering algorithms based on the corresponding vectors (e.g., k-means clustering or other clustering algorithm that mathematically clusters voice prints according to their vector representation in N-dimensional space). Fraud exposure engine 216 may further provide voice prints back to database 214 for storage. At an interaction 10, database 220 may be accessed to retrieve the PFE application data.

At interactions 11 and 12, a fraud exposure backend 222 and a fraud exposure frontend 224 may interact in order to review fraudster voice prints, voice print clustering, and fraudster voice print watchlists. These may include text-independent fraudster voice print watchlists and text-dependent fraudster voice print watchlists. Thus, fraud exposure backend 222 may serve fraud exposure frontend requests with the components of diagram 200. Fraud exposure frontend 224 may provide an application, interface, or the like where a user, administrator, data scientist, or the like can define new rules, review clustering results, manage the clustering results, and/or add new fraudsters and their corresponding voice print(s) to one or more watchlists. These processes and operations to generate text-dependent fraudster voice prints and watchlists, as well as perform the RTFP using the text-dependent voice biometrics, are discussed in further detail with regard to FIGS. 3, 4, 5, and 6.

Figure 3:
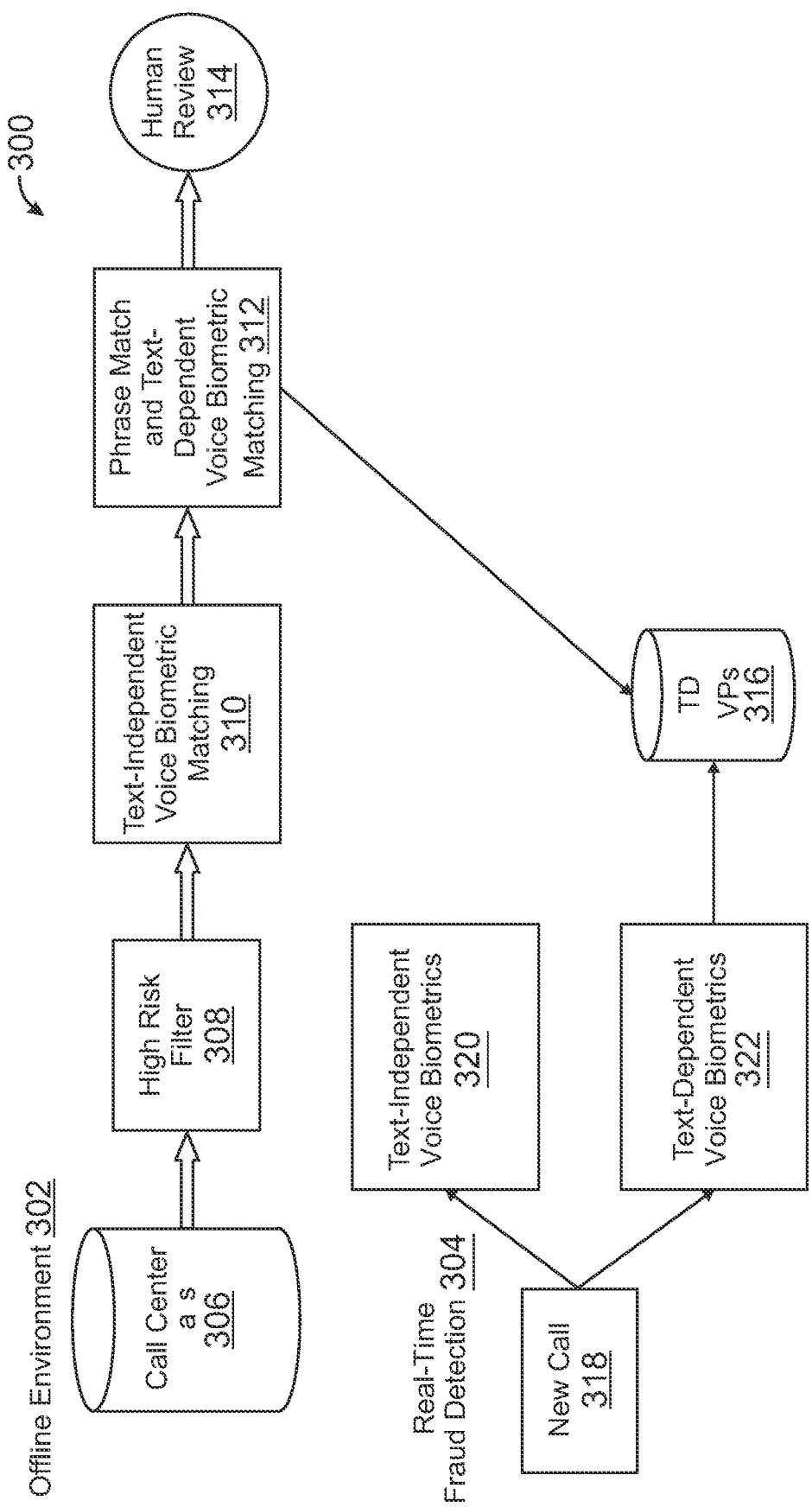
FIG. 3 is a simplified diagram of a system environment for converting phone calls to voice prints for text-dependent voice print fraudster watchlists used in real-time fraud detection according to some embodiments.

FIG. 3 is a simplified diagram of a system environment for converting phone calls to voice prints for text-dependent voice print fraudster watchlists used in real-time fraud detection according to some embodiments. Diagram 300 of FIG. 3 includes operations performed during voice biometric authentication and/or RTFP. For example, diagram 300 may be utilized by voice biometric application 130 discussed in reference to environment 100 of FIG. 1. The components of diagram 300 may be used during voice authentication and fraud detection through incoming voice print comparison with fraudster voice prints in one or more watchlists. In this regard, diagram 300 displays text-independent and text-dependent voice biometrics.

In diagram 300, an offline environment 302 may serve as a preprocessing environment where incoming calls and their corresponding audio data files are processed for use in text-dependent voice biometrics and voice print matching in a real-time fraud detection 304. Call center calls 306 (which may be calls or other voice interactions, including VOIP or voice chatting) are initially recorded and archived by a recording system. Post recording, a high risk filter 308 may be applied in order to identify whether any call center calls 306 are considered "high risk" or not. High risk filter 308 may implement one or more rule engines that include data processing rules to identify when calls are high risk from one or more pre-defined criteria, such as business data, authentication failures, agent designations, groups of agents reviewing or processing the calls, and the like.

When one or more of call center calls 306 are considered high risk, high risk filter 308 may pass the high risk call(s) to a text-independent voice biometric matching 310. Text-independent voice biometric matching 310 may include a clustering engine that detects similarities between calls that appear to be unrelated. However, the calls may be related by the clustering of text-independent voice biometric matching 310 based on similar audio features of a potential fraudster in the calls. Thus, text-independent voice biometric matching 310 outputs one or more clusters of calls that have the same or similar voice and therefore may identify a potential fraudster.

Thereafter, a phrase match and text-dependent voice biometric matching 312 may be performed using a phrase matching engine that searches for two or more putative fraudster audio data files for audio signals that indicate the same or similar person speaking a matching or repeated phrase. For example, any two or more high risk calls from call center calls 306 may include repetitive phrases by a potential fraudster. The repetitive phrases may be identified by repeated acoustic sequences and/or other repeated audio signals. By analyzing acoustic sequences and audio signals, the repetitive phrases may be independent of automatic speech recognition (ASR), language, or any combination thereof. Thus, specific identification of the words and/or phrases that are repeated is not necessarily required. However, textual data may also be analyzed using voice-to-text conversion. The operations and processes for identifying repetitive phrases are discussed in further detail with regard to FIG. 4.

Once repetitive portions of one or more putative fraudster audio data files are identified, the corresponding audio and audio signals from the files are sent for enrollment in text-dependent voice prints 316 for utilization by a text-dependent voice biometric engine. The audio from the files is converted to voice prints by a voice biometric operation that seeks to vectorize the audio into voice print vectors or another mathematical representation. For example, a vector may include a number of dimensions or features utilized to mathematically represent the data for the underlying audio signals. Thus, each of text-dependent voice prints 316 may be generated by converting the audio signals for the two or more putative fraudster files and/or portions of the files having the repetitive phrase. Text-dependent voice prints 316 may then be saved to a watchlist and linked to a fraudster. Further, a correspond threshold for voice print comparison may be set for each of text-dependent voice prints 316, for each watchlist having one or more of text-dependent voice prints 316, and/or for the voice biometric system for text-dependent voice biometrics. In one or more embodiments, human review 314 via an application may be performed for phrase match and text-dependent voice biometric matching 312 and enrollment of voice prints in text-dependent voice prints 316 (and corresponding text-dependent voice print watchlists).

Thereafter, real-time fraud detection 304 may be executed to provide RTFP using text-independent and text-dependent fraudster voice print watchlist having corresponding voice prints. A new call 318 may be detected and arrive at a call center or other voice communication channel. An agent may handle the call and implement real-time fraud detection 304 with a corresponding CRM system and/or phone call service. New call 318 may be processed, by buffering and sending buffered audio every X second, for text-independent voice biometrics 320. The buffered audio may be converted to one or more voice prints that are processed for RTFP. Further the buffered audio and/or voice print(s) may be sent for text-dependent voice biometrics 322 for real-time text-dependent fraud detection and prevention. The operations and processes for performing real-time fraud detection using text-dependent voice prints and watchlists are discussed in further detail with regard to FIG. 5.

Figure 4:
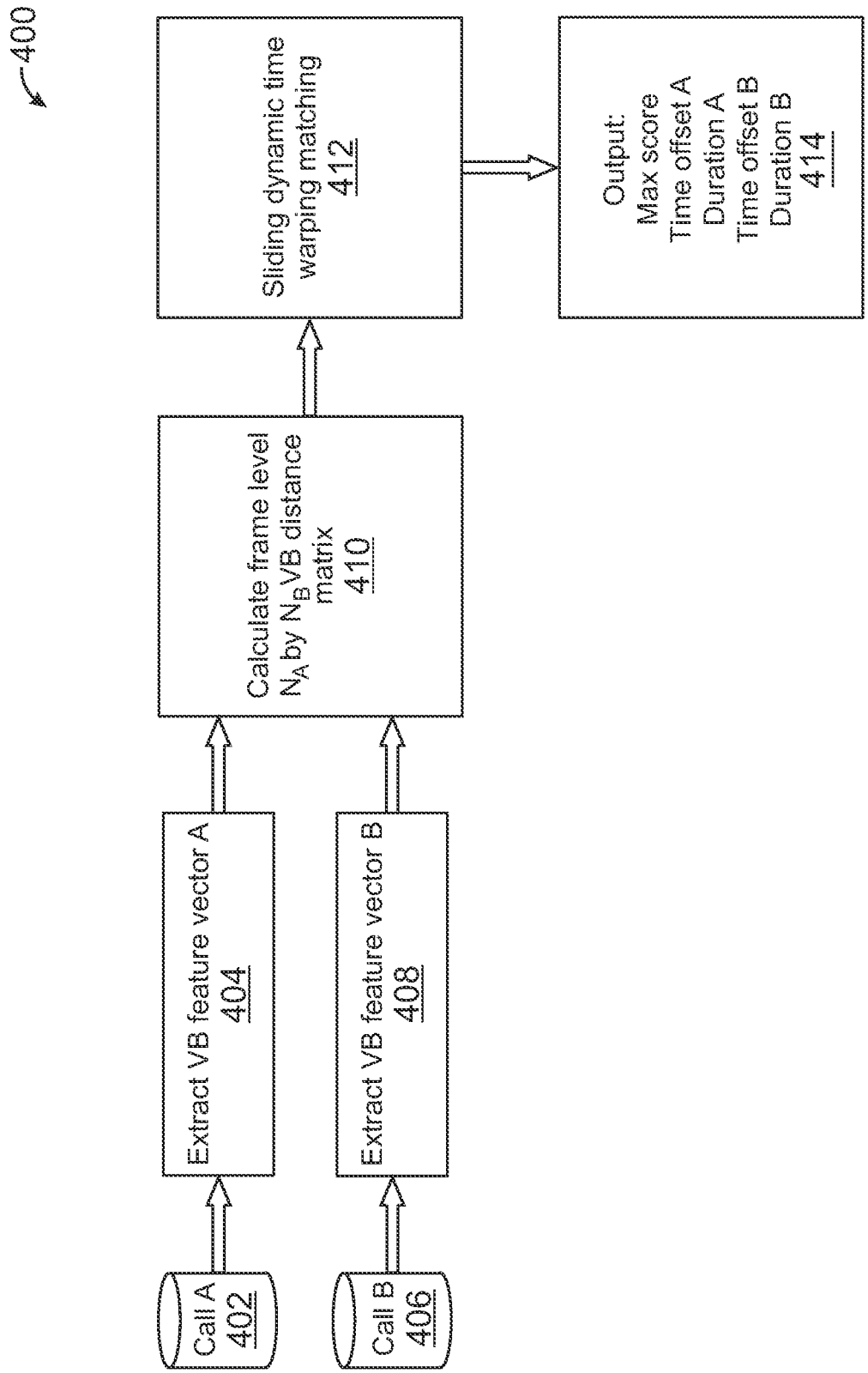
FIG. 4 is a simplified diagram of an exemplary process for determining whether two putative fraudster voice prints include repetitive fraudster phrases according to some embodiments.

FIG. 4 is a simplified diagram of an exemplary process for determining whether two putative fraudster voice prints include repetitive fraudster phrases according to some embodiments. Diagram 400 of FIG. 4 includes operations performed when determining repetitive fraudster phrases for use in text-dependent voice biometric systems and RTFP. For example, diagram 400 may be utilized by voice biometric application 130 discussed in reference to environment 100 of FIG. 1 when training a machine learning (ML) voice biometric system for text-dependent voice biometrics using voice prints. In this regard, diagram 400 includes a process to output a highest rated and/or best score during comparison of voice prints in order to perform identification of repetitive fraudster phrases in putative fraudster audio files.

In diagram 400, initially a call A 402 has a voice biometrics (VB) feature vector A 404 extracted and call B 406 has a VB feature vector B 408 extracted. This may be done by having an audio signal for call A 402 and call B 406 from the customer or user side processed using a voice activity detector (VAD) classifier. The VAD classifier may utilize an ML algorithm to find areas of speech and ignore areas of silence, ambient or auxiliary noises, and/or music from the speech. This may be done using an ML model trained for VAD classification using an ML algorithm. For example, ML models utilized to perform one or more of the operations described herein may include three groupings of layers—an input layer, one or more hidden layers, and an output layer having one or more nodes, however, different layers and different numbers of layers may also be utilized. For example, as many hidden layers as necessary or appropriate may be utilized.

Nodes are connected to nodes generally in an adjacent layer. In this example, an ML model receives a set of input values and produces one or more output values, for example, in the case of speech identification, whether the audio includes speech and what the audio signals are for the speech, or in the case of voice print categorization to determine a particular score during matching of voice prints. The outputs may correspond to a score and/or output classification. However, different, more, or fewer outputs may also be provided based on the training. When the ML model is used, each node in the input layer may correspond to a distinct attribute or input data type derived from the training data provided by service provider server 120. In a non-limiting example, the input nodes may include voice prints, which may or may not include annotations.

In some embodiments, each of the nodes in the hidden layer generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. Each node in a hidden layer may be connected to the nodes in the adjacent hidden layer such that nodes from the input layer may be connected to nodes in the hidden layer(s), and nodes in the hidden layer may be connected to nodes and corresponding outputs in output layer. The values generated by the hidden layer nodes may be used by the output layer node to produce an output value for the ML model. When the ML model is used to determine speech and/or score comparisons of voice prints, the output values produced by the ML model may indicate a likelihood that audio is speech or ancillary background noise, or that two or more voice prints include the same or similar speech or text based on acoustics.

The ML model may be trained by using training data, which may also be prepared by converting data to numerical representations and vectors. By providing training data to the ML model, the nodes in the hidden layers may be trained (adjusted) such that an optimal output (e.g., a classification) is produced in the output layer based on the training data. By continuously providing different sets of training data and penalizing the ML model when the output of the ML model is incorrect, the ML model (and specifically, the representations of the nodes in the hidden layer) may be trained (adjusted) to improve its performance in data classification. Adjusting the ML model may include adjusting the weights associated with each node in the hidden layer Once speech has been identified and segmented from the audio in the audio data files and signals, a Mel-spaced filter bank feature extractor may create sixteen log energy features per each 10 ms of speech (e.g., 100 frames per second). These filter banks are then linearly transformed to create sixteen features that are used for computing voice distances for VB feature vector A 404 and VB feature vector B 408. Thereafter, a frame level $N_A$ by $N_B$ distance matrix 410 is calculated. In order to calculate frame level $N_A$ by $N_B$ distance matrix 410, for each frame A=0 . . . $N_A$ and B=0 . . . $N_B$, an L2 distance is computed between the corresponding features, where $N_A$ and $N_B$ are the number of frames in call A 402 and call B 406, respectively. The L2 distances are then stored in frame level $N_A$ by $N_B$ distance matrix 410

Sliding dynamic time warping matching 412 may then be applied in order to compare speech segments where the same or similar words may be used but the audio may be shorter or longer such that some frames may be missed or there may be extra frames. Sliding dynamic time warping matching 412 allows for distance calculations and may be used both for the determination of repetitive phrases in putative fraudster audio data files and real-time text-dependent voice biometrics for RTFP. Sliding dynamic time warping matching 412 may allow for the same or similar spectrum in the audio to be used but vary to a degree, such as by varying in length by 10% or the like. In this regard, pseudo code and equations for performing the operations and processes of sliding dynamic time warping matching 412 may be shown as follows in Equations 1. Although $L_{min}$ is 100 and $L_{max}$ is 200, other values may also be set as desired for the corresponding system and voice biometrics:

Sliding dynamic time warping matching 412:

$L_{min}$=100; The minimum length of a match in centiseconds(frames).

$L_{max}$=200; The maximum length of a match in centiseconds(frames).

For($a$=0;$a$<$N_A$;$a$+=1)

For($b$=0;$b$<$N_B$;$b$+=1)

For($L$=$L_{min}$;$L$<$L_{max}$;$L$+=1)   Equations 1

Find minimum warping distance starting at frame a in call A 402 and frame b in call B 406 with a match length L After sliding dynamic time warping matching 412 is performed, an output 414 may be provided. Output 414 may correspond to a best or highest score in a comparison that is returned with a start and end time in each of call A 402 and call B 406. Audio data files with high or good scores may often have correct matches that correspond to the same person stating the same phrase (e.g., a fraudster repeating a phrase during different audio calls to engage in fraud, such as based on a scripted attempt at fraud). Thus, clusters with a highest score may be presented to a reviewer first as they may be likely to have the same person in different calls for call A 402 and call B 406.

Figure 5:
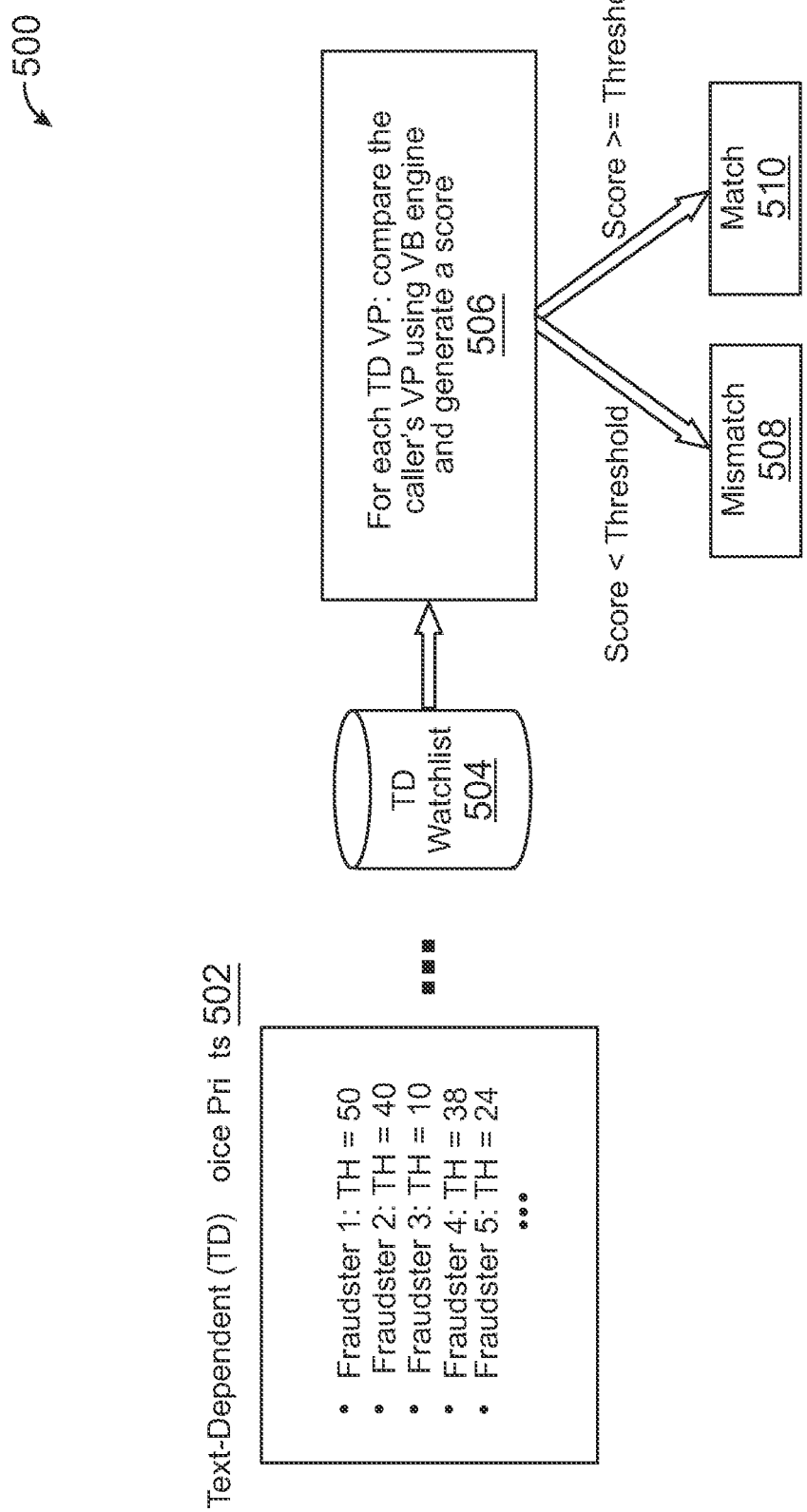
FIG. 5 is a simplified diagram of an exemplary process for performing real-time fraud detection using a text-dependent fraudster voice print watchlist that includes voice prints having repetitive fraudster phrases according to some embodiments.

FIG. 5 is a simplified diagram of an exemplary process for performing real-time fraud detection using a text-dependent fraudster voice print watchlist that includes voice prints having repetitive fraudster phrases according to some embodiments. Diagram 500 of FIG. 5 includes operations performed during text-dependent voice biometric systems and RTFP using repetitive fraudster phrases. For example, diagram 500 may be utilized by voice biometric application 130 discussed in reference to environment 100 of FIG. 1 when performing text-dependent voice biometrics using voice prints of fraudsters repeating the same or similar phrase. In this regard, diagram 500 includes a process to output a mismatch 508 or a match 510 of an incoming call to repetitive fraudster phrases in putative fraudster audio files.

In diagram 500, a call may be initiated by a user with a voice communication system, such as with an agent at a call center for a service provider. The call may be captured by a voice recording and RTFP system using text-independent and text-dependent voice biometrics and fraudster voice print watchlists. Every X seconds, the audio signals from the incoming call is buffered and sent for RTFP using a voice biometric system. The buffered audio signals are converted to a voice print, for example, by extracting a voice print vector. Thereafter, text-dependent voice prints 502 in text-dependent watchlist 504 are used for voice print comparison and RTFP in a text-dependent voice biometric engine and system. In each embodiment throughout this disclosure, the term "X seconds" has been used and may be the same or a different amount, and may be modified or changed as described herein or as otherwise modified as known by those of ordinary skill in the art.

For example, each fraudster voice print in text-dependent voice prints 502 may be associated with a corresponding threshold (TH) shown in diagram 500. Each TH for the corresponding fraudster voice prints indicates a threshold score or match that would be optimal or selected for the corresponding fraudster. In other embodiments, a single TH for a watchlist or a subset of a watchlist (e.g., multiple fraudster voice prints) may be used, or a TH may be used across multiple or all watchlists in a voice biometric system.

The THs may be determined based on customer data, tests using ongoing data collection, preferences and/or administrator settings, and the like.

With a given voice print from an incoming call, the voice print may be compared to text-dependent voice prints 502 in text-dependent watchlist 504 during voice print comparisons 506. A voice biometric engine may be used to compare voice prints (e.g., based on vectors for the voice prints) and generate a score. This may be performed in a loop (e.g., iteratively) using text-dependent voice prints 502, which may be done in parallel or sequentially. Once scores are output, the scores may be compared and/or weight against the corresponding TH established for the voice print, the watchlists, or all watchlist. If the score is less than (or equal to, in some embodiments) the TH, then mismatch 508 may be output by the voice biometric engine. This may indicate no match and further monitoring may be conducted. However, if the score is equal to or higher than the TH, match 510 may be output. Match 510 may cause an alert to be presented to the corresponding agent or employee on the call. Match 510 may further cause RTFP to be implemented by securing data and/or preventing access to certain data, as well as reporting the call and/or potentially fraudulent user to an administrator, authority, or the like. Thus, when a response causes match 510, the response may trigger an alert that may be sent to the agent via an event, API call, or as a result of an already triggered API (e.g., at the beginning of the call, the agent's software for the call triggers a "Detect Fraud" API). There may be an API integration between the voice biometric system and the agent's software used for the call. In contrast, mismatch 508 may cause the voice biometric system to take another voice print and/or section of audio from the call for further monitoring and RTFP using text-dependent voice biometrics.

Figure 6:
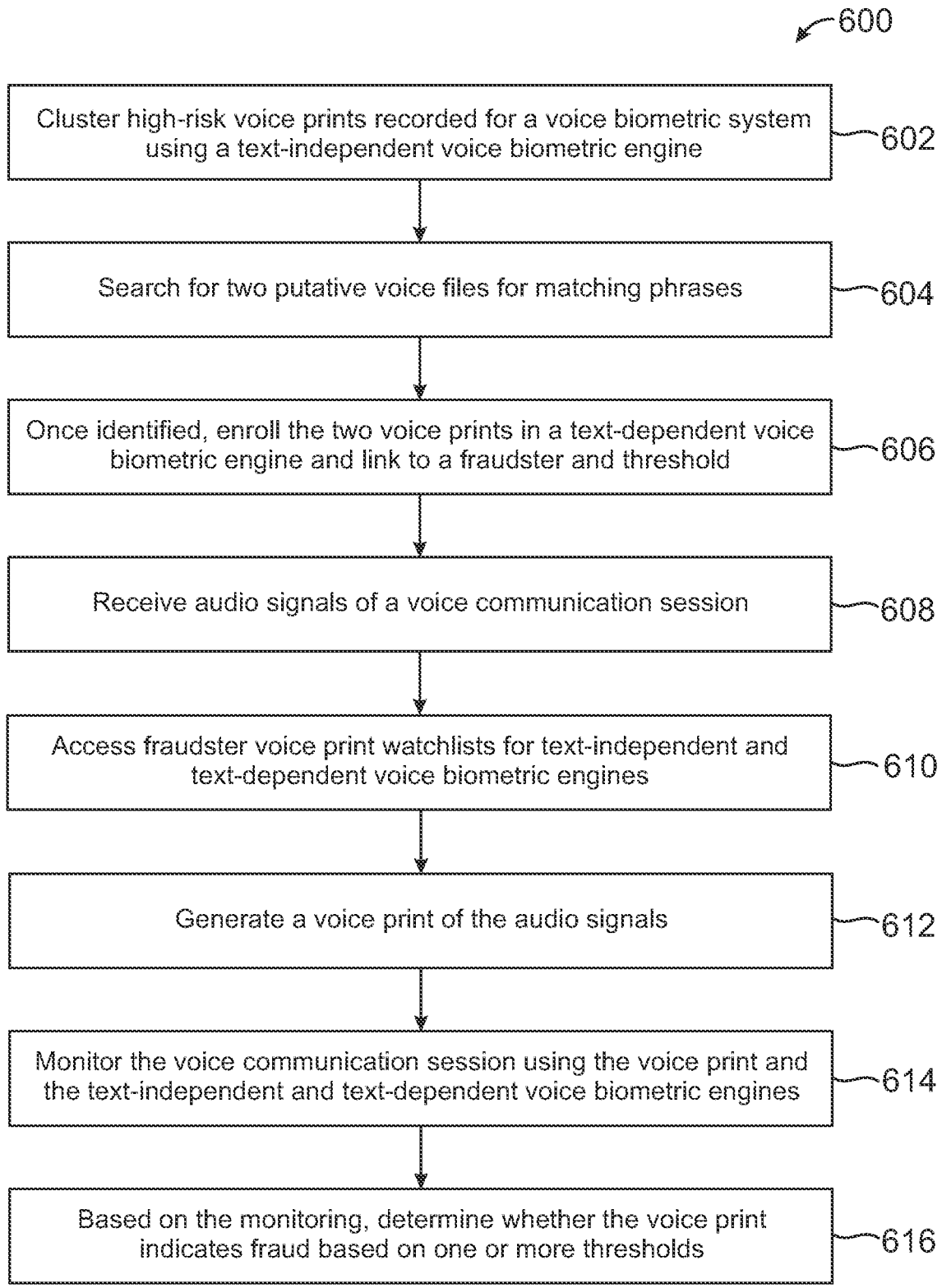
FIG. 6 is an exemplary flowchart for performing real-time fraud prevention using text-dependent fraudster voice print watchlists in a voice biometric authentication and fraud detection system according to some embodiments.

FIG. 6 is an exemplary flowchart for performing real-time fraud prevention using text-dependent fraudster voice print watchlists in a voice biometric authentication and fraud detection system according to some embodiments. In some embodiments, generation and utilization of a voice biometric system for real-time text-dependent fraud detection described in method 600 of FIG. 6 can be implemented and performed using an online service provider system, such as service provider server 120. One or more of the processes 602-616 of method 600 may be implemented, at least in part, in the form of executable code stored on non-transitory, tangible, machine-readable media that when run by one or more processors may cause the one or more processors to perform one or more of the processes 602-616. In some embodiments, method 600 can be performed by one or more computing devices in environment 100 of FIG. 1.

At step 602 of method 600, high-risk voice prints recorded for a voice biometric system are clustered using a text-independent voice biometric engine. The high-risk voice prints may be identified based on a rule-based engine and one or more data processing rules, as well as based on an ML model trained to identify high-risk voice prints from corresponding data and/or voice print vectors. A text-independent voice biometric engine may cluster voice prints based on the vectors for the voice prints to identify similar voice prints of the same or similar user. At step 604, two putative voice files are searched for matching phrases. The voice files may be for a potential fraudster that is likely to repeat the same or similar phrases when engaging in fraud. Thus, the matching phrases may be searched based on similar acoustics and/or audio signals so that the search may be ASR and language independent.

At step 606, once the two putative voice print files are identified, the two voice prints are enrolled in a text-dependent voice biometric engine and linked to a fraudster and threshold. The voice prints are enrolled by converting audio signals for the files into voice prints (e.g., by vectorizing) and storing the corresponding voice prints to a text-dependent fraudster voice print watchlist. The voice prints may also be associated with a threshold for a particular fraudster, set of fraudsters, watchlist, and/or set of watchlists. For example, the threshold may require a matching score of 75 or better. This watchlist is then used by the text-dependent voice biometric engine for text-dependent RTFP and other voice biometric processing.

At step 608, audio signals of a voice communication session are received. The audio signals may be buffered in a real-time buffer system and storage, and every X seconds of audio signals may be sent for conversion to and/or extraction of a corresponding voice print for the incoming audio signals of the voice communication session. This may be done in real-time or near-real time (e.g., less than about 5 seconds, preferably less than about 2 seconds) to provide RTFP. At step 610, fraudster voice print watchlists for text-independent and text-dependent voice biometric engines are accessed. The watchlists may include both text-independent and text-dependent voice prints so that comparison and scoring may be made based on comparing the voice print for the incoming audio signals to the voice prints in the watchlist. Thus, at step 612, a voice print is generated from the audio signals. This includes generating a voice print by procedurally computing a vector or other mathematical representation from the audio signals.

At step 614, the voice communication session is monitored using the voice print and the text-independent and text-dependent voice biometric engines. Text-independent and text-dependent watchlists may be used for comparison of voice prints during the voice communication session. Each comparison may output a corresponding score, which may then be compared with and weighed against the threshold for each voice print in the text-independent and text-dependent watchlists. At step 616, based on the monitoring, it is determined whether the voice print indicates fraud based on one or more thresholds. If below the threshold(s), no fraud and a mismatch may be output, and further monitoring may occur. However, if at or above the threshold(s), an alert may be output and additional steps for RTFP may be executed.

As discussed above and further emphasized here, FIGS. 1, 2, 3, 4, 5, and 6 are merely examples of service provider server 120 and corresponding methods for performing text-dependent voice print matching and RTFP, which examples should not be used to unduly limit the scope of the claims. One of ordinary skill in the art would recognize many variations, alternatives, and modifications may be use in place of and/or in addition to the details disclosed herein.

Figure 7:
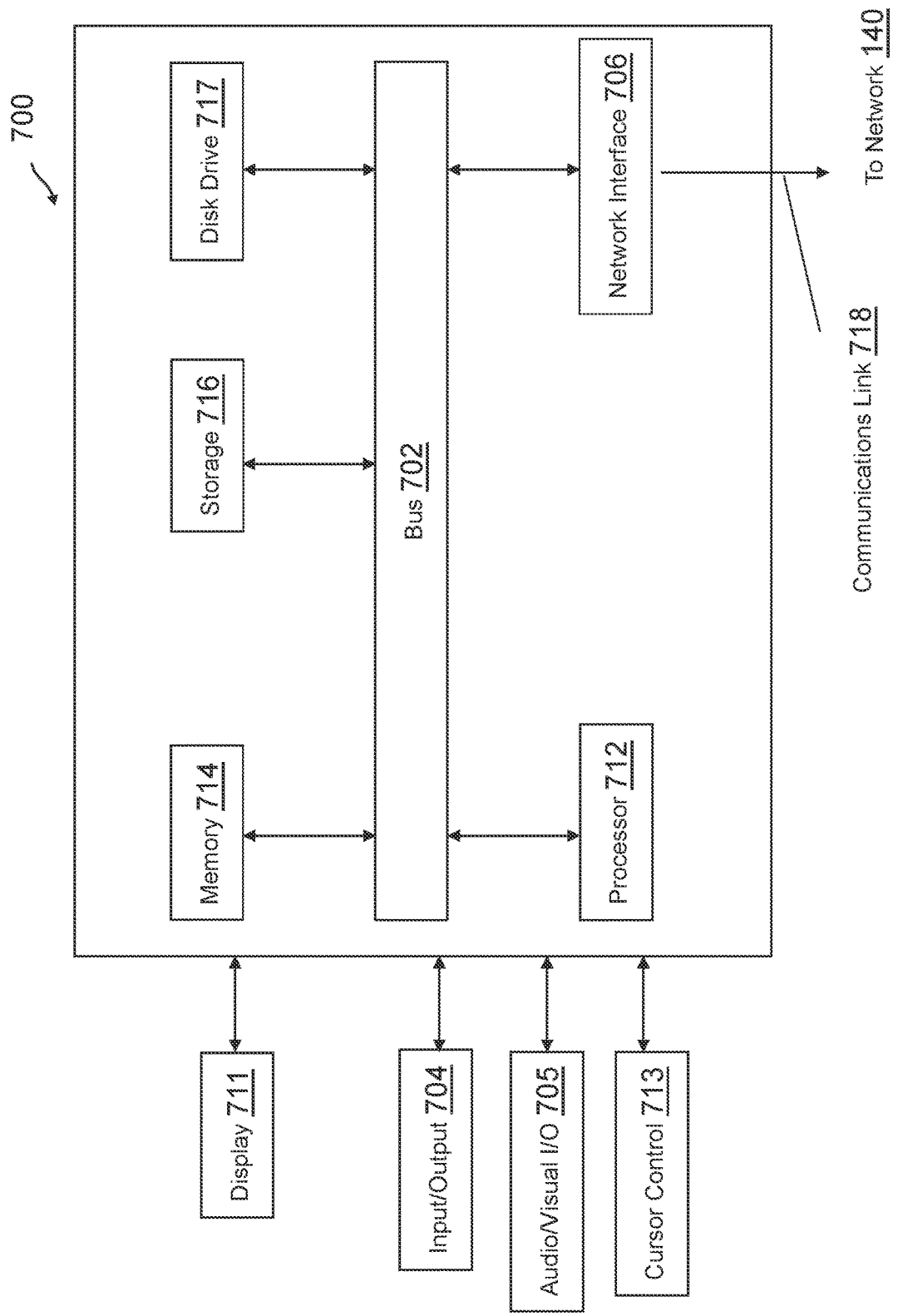
FIG. 7 is a simplified diagram of a computing device according to some embodiments.

FIG. 7 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio/visual input/output component 705 may also be included to allow a user to use voice for inputting information by converting audio signals and/or capturing of video to input video. Audio/visual I/O component 705 may allow the user to hear audio, and well as input and/or output video. A transceiver or network interface 706 transmits and receives signals between computer system 700 and other devices, such as another communication device, service device, or a service provider server via network 140. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A voice biometric system for real-time fraud detection with a fraudster voice print watchlist of repetitive fraudster phrases, the voice biometric system comprising:
    a processor and a computer readable medium operably coupled thereto, the computer readable medium comprising a plurality of instructions stored in association therewith that are accessible to, and executable by, the processor, to perform fraud detection operations which comprise:
      detecting a voice communication session with a user, wherein the voice communication session comprises an audio signal of the user;
      accessing the fraudster voice print watchlist comprising a plurality of fraudster voice prints having repeated acoustic sequences of the repetitive fraudster phrases extracted from portions of a plurality of putative fraudster audio files by a machine learning (ML) model trained using repetitive phrase training data, wherein each of the repetitive fraudster phrases are found in at least two of the portions of the plurality of putative fraudster audio files by the ML model;
      generating a voice print of the user using the audio signal of the user, wherein the voice print comprises an audio file having a plurality of acoustic sequences of the user speaking one or more words;
      monitoring, in real-time during the voice communication session, the user for the real-time fraud detection, wherein the monitoring comprises:

matching the plurality of acoustic sequences for the one or more words spoken by the user to the repeated acoustic sequences of the repetitive fraudster phrases corresponding to the plurality of fraudster voice prints from the fraudster voice print watchlist; and determining, based on the monitoring, whether the voice print of the user during the voice communication session meets or exceeds a scoring threshold for matching with one or more of the plurality of fraudster voice prints of one or more of the repetitive fraudster phrases from the fraudster voice print watchlist during the voice communication session.

2. The voice biometric system of claim 1, wherein, before detecting the voice communication session, the fraud detection operations further comprise:

recording a plurality of call audio files during previous communication sessions with a plurality of users;

detecting that the plurality of putative fraudster audio files from the plurality of call audio files are high-risk communication sessions, wherein the plurality of putative fraudster audio files comprises a subset of the plurality of call audio files;

performing a text independent clustering of the plurality of putative fraudster audio files using the plurality of fraudster voice prints; and identifying, using a phrase matching engine comprising the ML model, the repeated acoustic sequences of the repetitive fraudster phrases from the plurality of putative fraudster audio files clustered by the text independent clustering.

3. The voice biometric system of claim 2, wherein the phrase matching engine identifies the repetitive fraudster phrases by:

searching, using the ML model, for the at least two of the portions of the plurality of putative fraudster audio files having one of the repetitive fraudster phrases; and scoring, using text-dependent voice biometrics and the plurality of fraudster voice prints, a similarity distance of one or more portions of the at least two of the portions of the plurality of putative fraudster audio files.

4. The voice biometric system of claim 3, wherein scoring the similarity distance comprises:

processing each of the at least two of the portions of the plurality of putative fraudster audio files using a voice activity detector (VAD), wherein the VAD identifies areas of speech and ignores areas of silence, noise, music, or any combination thereof in the at least two of the portions of the plurality of putative fraudster audio files;

identifying, based on the processing, speech segments in the at least two of the portions of the plurality of putative fraudster audio files from the repeated acoustic sequences;

generating at least two vectors comprising a plurality of features for the speech segments; and calculating a frame level distance matrix for the at least two vectors, wherein the frame level distance matrix is used for scoring the similarity distance.

5. The voice biometric system of claim 3, when searching for the at least two of the portions of the plurality of putative fraudster audio files uses dynamic time warping for the repetitive fraudster phrases and the plurality of putative fraudster audio files, and wherein the fraud detection operations further comprise:

extracting the repeated acoustic sequences of the repetitive fraudster phrases from the at least two of the portions of the plurality of putative fraudster audio files;

sending the repeated acoustic sequences of the repetitive fraudster phrases to a fraud biometric enrollment for the phrase matching engine;

receiving a confirmation of the repeated acoustic sequences of the repetitive fraudster phrases for the fraud biometric enrollment, wherein the confirmation comprises at least one of a manual confirmation by one of a data scientist or an administrator for the phrase matching engine or an automatic confirmation; and saving, based on the confirmation, the plurality of fraudster voice prints associated with the repeated acoustic sequences and the repetitive fraudster phrases.

6. The voice biometric system of claim 2, wherein, before identifying the repetitive fraudster phrases, the fraud detection operations further comprise:

training, using ML model features extracted from the repetitive phrase training data, the ML model of the phrase matching engine, wherein the repetitive phrase training data comprises a set of audio files having a plurality of voice samples for a plurality of phrases.

7. The voice biometric system of claim 1, wherein monitoring the audio signal comprises:

utilizing a sliding window with the voice print of the user to identify segments of the voice print corresponding to the user speaking the one or more words; and matching, based the scoring threshold, the segments to the plurality of fraudster voice prints, wherein the matching allows a time difference between the segments and the plurality of fraudster voice prints with the scoring threshold, wherein determining whether the voice print of the user during the voice communication session meets or exceeds the scoring threshold uses the matching.

8. The voice biometric system of claim 7, wherein generating the voice print of the user comprises:

buffering the audio signal during the voice communication session;

periodically sending, during the voice communication session at a time interval, the buffered audio signal for generating the voice print of the user; and obtaining customer data for the user.

9. The voice biometric system of claim 1, wherein determining whether the voice print of the user during the voice communication session meets or exceeds the scoring threshold is independent of automatic speech recognition (ASR), a language, or a combination thereof.

10. A method for real-time fraud detection with a fraudster voice print watchlist of repetitive fraudster phrases for a voice biometric system, which method comprises:

detecting a voice communication session with a user, wherein the voice communication session comprises an audio signal of the user;

accessing the fraudster voice print watchlist comprising a plurality of fraudster voice prints having repeated acoustic sequences of the repetitive fraudster phrases extracted from portions of a plurality of putative fraudster audio files by a machine learning (ML) model trained using repetitive phrase training data, wherein each of the repetitive fraudster phrases are found in at least two of the portions of the plurality of putative fraudster audio files by the ML model;

generating a voice print of the user using the audio signal of the user, wherein the voice print comprises an audio file having a plurality of acoustic sequences of the user speaking one or more words;

monitoring, in real-time during the voice communication session, the user for the real-time fraud detection, wherein the monitoring comprises:
matching the plurality of acoustic sequences for the one or more words spoken by the user to the repeated acoustic sequences of the repetitive fraudster phrases corresponding to the plurality of fraudster voice prints from the fraudster voice print watchlist; and
determining, based on the monitoring, whether the voice print of the user during the voice communication session meets or exceeds a scoring threshold for matching with one or more of the plurality of fraudster voice prints of one or more of the repetitive fraudster phrases from the fraudster voice print watchlist during the voice communication session.

11. The method of claim 10, wherein, before detecting the voice communication session, the method further comprises:
recording a plurality of call audio files during previous communication sessions with a plurality of users;
detecting that the plurality of putative fraudster audio files from the plurality of call audio files are high-risk communication sessions, wherein the plurality of putative fraudster audio files comprises a subset of the plurality of call audio files;
performing a text independent clustering of the plurality of putative fraudster audio files using the plurality of fraudster voice prints; and
identifying, using a phrase matching engine comprising the ML model, the repeated acoustic sequences of the repetitive fraudster phrases from the plurality of putative fraudster audio files clustered by the text independent clustering.

12. The method of claim 11, wherein the phrase matching engine identifies the repetitive fraudster phrases by:
searching, using the ML model, for the at least two of the portions of the plurality of putative fraudster audio files having one of the repetitive fraudster phrases; and
scoring, using text-dependent voice biometrics and the plurality of fraudster voice prints, a similarity distance of one or more portions of the at least two of the portions of the plurality of putative fraudster audio files.

13. The method of claim 12, wherein scoring the similarity distance comprises:
processing each of the at least two of the portions of the plurality of putative fraudster audio files using a voice activity detector (VAD), wherein the VAD identifies areas of speech and ignores areas of silence, noise, music, or any combination thereof in the at least two of the portions of the plurality of putative fraudster audio files;
identifying, based on the processing, speech segments in the at least two of the portions of the plurality of putative fraudster audio files from the repeated acoustic sequences;
generating at least two vectors comprising a plurality of features for the speech segments; and
calculating a frame level distance matrix for the at least two vectors, wherein the frame level distance matrix is used for scoring the similarity distance.

14. The method of claim 12, when searching for the at least two of the portions of the plurality of putative fraudster audio files uses dynamic time warping for the repetitive fraudster phrases and the plurality of putative fraudster audio files, and wherein the method further comprises:
extracting the repeated acoustic sequences of the repetitive fraudster phrases from the at least two of the portions of the plurality of putative fraudster audio files;
sending the repeated acoustic sequences of the repetitive fraudster phrases to a fraud biometric enrollment for the phrase matching engine;
receiving a confirmation of the repeated acoustic sequences of the repetitive fraudster phrases for the fraud biometric enrollment, wherein the confirmation comprises at least one of a manual confirmation by one of a data scientist or an administrator for the phrase matching engine or an automatic confirmation; and
saving, based on the confirmation, the plurality of fraudster voice prints associated with the repeated acoustic sequences and the repetitive fraudster phrases.

15. The method of claim 11, wherein, before identifying the repetitive fraudster phrases, the method further comprises:
training, using ML model features extracted from the repetitive phrase training data, the ML model of the phrase matching engine, wherein the repetitive phrase training data comprises a set of audio files having a plurality of voice samples for a plurality of phrases.

16. The method of claim 10, wherein monitoring the audio signal comprises:
utilizing a sliding window with the voice print of the user to identify segments of the voice print corresponding to the user speaking the one or more words; and
matching, based the scoring threshold, the segments to the plurality of fraudster voice prints, wherein the matching allows a time difference between the segments and the plurality of fraudster voice prints with the scoring threshold,
wherein determining whether the voice print of the user during the voice communication session meets or exceeds the scoring threshold uses the matching.

17. The method of claim 16, wherein generating the voice print of the user comprises:
buffering the audio signal during the voice communication session;
periodically sending, during the voice communication session at a time interval, the buffered audio signal for generating the voice print of the user; and
obtaining customer data for the user.

18. The method of claim 10, wherein determining whether the voice print of the user during the voice communication session meets or exceeds the scoring threshold is independent of automatic speech recognition (ASR), a language, or a combination thereof.

19. A non-transitory computer-readable medium having stored thereon computer-readable instructions executable to cause real-time fraud detection with a fraudster voice print watchlist of repetitive fraudster phrases for a voice biometric system, which fraud detection operations comprise:
detecting a voice communication session with a user, wherein the voice communication session comprises an audio signal of the user;
accessing the fraudster voice print watchlist comprising a plurality of fraudster voice prints having repeated acoustic sequences of the repetitive fraudster phrases extracted from portions of a plurality of putative fraudster audio files by a machine learning (ML) model trained using repetitive phrase training data, wherein each of the repetitive fraudster phrases are found in at least two of the portions of the plurality of putative fraudster audio files by the ML model;

generating a voice print of the user using the audio signal of the user, wherein the voice print comprises an audio file having a plurality of acoustic sequences of the user speaking one or more words;

monitoring, in real-time during the voice communication session, the user for the real-time fraud detection, wherein the monitoring comprises:
- matching the plurality of acoustic sequences for the one or more words spoken by the user to the repeated acoustic sequences of the repetitive fraudster phrases corresponding to the plurality of fraudster voice prints from the fraudster voice print watchlist; and determining, based on the monitoring, whether the voice print of the user during the voice communication session meets or exceeds a scoring threshold for matching with one or more of the plurality of fraudster voice prints of one or more of the repetitive fraudster phrases from the fraudster voice print watchlist during the voice communication session.

20. The non-transitory computer-readable medium of claim 19, wherein, before detecting the voice communication session, the fraud detection operations further comprise:
- recording a plurality of call audio files during previous communication sessions with a plurality of users;
- detecting that the plurality of putative fraudster audio files from the plurality of call audio files are high-risk communication sessions, wherein the plurality of putative fraudster audio files comprises a subset of the plurality of call audio files;
- performing a text independent clustering of the plurality of putative fraudster audio files using the plurality of fraudster voice prints; and
- identifying, using a phrase matching engine comprising the ML model, the repeated acoustic sequences of the repetitive fraudster phrases from the plurality of putative fraudster audio files clustered by the text independent clustering.

* * * * *